(12) United States Patent
Smith et al.

(10) Patent No.: US 11,613,604 B2
(45) Date of Patent: Mar. 28, 2023

(54) ISOCYANATE-REACTIVE COMPOSITIONS, POLYURETHANE FOAMS FORMED THEREFROM, MULTI-LAYER COMPOSITE ARTICLES THAT INCLUDE SUCH FOAMS, AND METHODS FOR THEIR PREPARATION

(71) Applicant: Covestro LLC, Pittsburgh, PA (US)

(72) Inventors: Peter K. Smith, Imperial, PA (US); Michael T. Wellman, Moundsville, WV (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 17/359,928

(22) Filed: Jun. 28, 2021

(65) Prior Publication Data

US 2022/0411564 A1 Dec. 29, 2022

(51) Int. Cl.
| | |
|---|---|
| *C08G 18/42* | (2006.01) |
| *C08G 18/48* | (2006.01) |
| *B32B 5/24* | (2006.01) |
| *B32B 7/12* | (2006.01) |
| *B32B 37/10* | (2006.01) |
| *B32B 37/12* | (2006.01) |
| *C08G 18/18* | (2006.01) |
| *C08G 101/00* | (2006.01) |

(52) U.S. Cl.
CPC .......... *C08G 18/4216* (2013.01); *B32B 5/245* (2013.01); *B32B 7/12* (2013.01); *B32B 37/10* (2013.01); *B32B 37/12* (2013.01); *C08G 18/1816* (2013.01); *C08G 18/485* (2013.01); *C08G 18/4845* (2013.01); *B32B 2262/101* (2013.01); *B32B 2266/0278* (2013.01); *B32B 2305/022* (2013.01); *B32B 2305/18* (2013.01); *C08G 2101/00* (2013.01); *C08G 2110/0008* (2021.01); *C08G 2110/0075* (2021.01)

(58) Field of Classification Search
None
See application file for complete search history.

(56) References Cited

U.S. PATENT DOCUMENTS

| | | | |
|---|---|---|---|
| 4,729,917 | A | 3/1988 | Symdra et al. |
| 5,591,289 | A | 1/1997 | Souders et al. |
| 6,110,580 | A | 8/2000 | Gebreselassie et al. |
| 6,299,811 | B1 | 10/2001 | Gebreselassie et al. |
| 7,538,236 | B2 | 5/2009 | Narine et al. |
| 7,744,150 | B2 | 6/2010 | Ariznavarreta et al. |
| 7,828,991 | B2 | 11/2010 | Reese et al. |
| 7,918,952 | B1 | 4/2011 | Young |
| 8,178,593 | B2 | 5/2012 | Suppes et al. |
| 8,183,302 | B2 | 5/2012 | Klesczewski et al. |
| 8,308,910 | B2 | 11/2012 | Mikkonen et al. |
| 8,349,907 | B2 | 1/2013 | Henning et al. |
| 8,394,868 | B2 | 3/2013 | Casati et al. |
| 8,436,063 | B2 | 5/2013 | Bartelink et al. |
| 8,535,476 | B2 | 9/2013 | Casati et al. |
| 8,598,247 | B2 | 12/2013 | Vairo |
| 8,598,248 | B2 | 12/2013 | Hager et al. |
| 8,623,984 | B2 | 1/2014 | Henning et al. |
| 8,664,352 | B2 | 3/2014 | Abraham et al. |
| 8,686,058 | B2 | 4/2014 | Obi et al. |
| 8,692,030 | B1 | 4/2014 | Ionescu et al. |
| 8,784,680 | B2 | 7/2014 | Tanguay et al. |
| 8,808,485 | B2 | 8/2014 | James et al. |
| 8,815,968 | B2 | 8/2014 | Rowlands et al. |
| 8,901,189 | B2 | 12/2014 | McClarren et al. |
| 8,946,310 | B2 | 2/2015 | Glos et al. |
| 9,035,105 | B2 | 5/2015 | Reese et al. |
| 9,096,715 | B2 | 8/2015 | Mecking et al. |
| 9,156,980 | B2 | 10/2015 | Bastioli |
| 9,249,252 | B2 | 2/2016 | Ngantung et al. |
| 9,309,345 | B2 | 4/2016 | Hickey et al. |
| 9,321,891 | B2 | 4/2016 | Perry et al. |
| 9,657,130 | B1 | 5/2017 | King et al. |
| 9,732,181 | B2 | 8/2017 | King et al. |
| 9,834,638 | B2 | 12/2017 | Sounik et al. |
| 9,951,171 | B2 | 4/2018 | Tabor et al. |
| 10,000,442 | B2 | 6/2018 | Narine et al. |
| 10,239,985 | B2 | 3/2019 | Adkins et al. |
| 10,259,771 | B2 | 4/2019 | Guo et al. |

(Continued)

FOREIGN PATENT DOCUMENTS

| | | |
|---|---|---|
| CA | 1106744 A | 8/1981 |
| CN | 101544083 A | 9/2009 |

(Continued)

OTHER PUBLICATIONS

Kaluschke, T et al., Rigid Polyurethane Foams Having Improved Fire Behavior, Nov. 8, 2018, machine translation of WO 2018202567 (Year: 2018).*

(Continued)

*Primary Examiner* — Chinessa T. Golden
(74) *Attorney, Agent, or Firm* — Donald R. Palladino

(57) ABSTRACT

Isocyanate-reactive composition that include a polyol blend, a blowing agent composition, and a catalyst. The polyol blend includes a polyether polyol having a functionality of 2 to 6 and an OH number of 20 to 50 mg KOH/g, which is present in an amount of at least 30% by weight, based on total weight of the isocyanate-reactive composition, and an aromatic polyester polyol having a functionality of 1.5 to 3 and an OH number of 150 to 450 mg KOH/g, which is present in an amount of at least 40% by weight, based on total weight of the isocyanate-reactive composition. The blowing agent composition includes water, the water being present in an amount of 1 to 20% by weight, based on total weight of the isocyanate-reactive composition and in an amount of at least 90% by weight, based on total weight of the blowing agent composition. The isocyanate-reaction composition has a green content of at least 30% by weight, based on total weight of the isocyanate-reactive composition. Polyurethane foam-forming reaction mixtures, polyurethane foams, multi-layer composite articles and methods for their production are also described.

21 Claims, No Drawings

(56) References Cited

U.S. PATENT DOCUMENTS

| | | |
|---|---|---|
| 10,316,139 B2 | 6/2019 | Bastioli et al. |
| 10,323,212 B2 | 6/2019 | Hager et al. |
| 10,676,583 B2 | 6/2020 | Kang et al. |
| 10,676,596 B2 | 6/2020 | Lin et al. |
| 2001/0012812 A1 | 8/2001 | Spengler |
| 2004/0013853 A1 | 1/2004 | Mandzsu et al. |
| 2004/0234744 A1 | 11/2004 | Byma et al. |
| 2004/0235376 A1 | 11/2004 | Byma et al. |
| 2004/0235378 A1 | 11/2004 | Byma et al. |
| 2005/0070620 A1 | 3/2005 | Herrington et al. |
| 2006/0208378 A1 | 9/2006 | Khambete et al. |
| 2006/0237130 A1 | 10/2006 | Thompson |
| 2006/0270747 A1 | 11/2006 | Griggs |
| 2006/0293400 A1 | 12/2006 | Wiltz et al. |
| 2007/0066692 A1 | 3/2007 | De Juan Saiz et al. |
| 2007/0151658 A1 | 7/2007 | Khambete et al. |
| 2007/0238798 A1 | 10/2007 | McDaniel et al. |
| 2007/0238800 A1 | 10/2007 | Neal et al. |
| 2008/0003907 A1 | 1/2008 | Black et al. |
| 2008/0008862 A1 | 1/2008 | Ogle et al. |
| 2008/0045638 A1 | 2/2008 | Chapman et al. |
| 2009/0022934 A1 | 1/2009 | Park |
| 2009/0043000 A1 | 2/2009 | Nascimento et al. |
| 2009/0170972 A1 | 7/2009 | Sonney et al. |
| 2009/0236765 A1 | 9/2009 | Kessing |
| 2009/0253816 A1 | 10/2009 | Nascimento et al. |
| 2009/0298374 A1 | 12/2009 | Delmas |
| 2010/0204353 A1 | 8/2010 | Casati |
| 2010/0215942 A1 | 8/2010 | Casati et al. |
| 2010/0286299 A1 | 11/2010 | Casati et al. |
| 2011/0020633 A1 | 1/2011 | Johnson et al. |
| 2011/0105634 A1 | 5/2011 | Cookson et al. |
| 2011/0118432 A1 | 5/2011 | Zhao et al. |
| 2012/0123005 A1 | 5/2012 | Motta et al. |
| 2012/0175074 A1 | 7/2012 | Gupta et al. |
| 2012/0178331 A1 | 7/2012 | Gupta et al. |
| 2013/0030073 A1 | 1/2013 | Wardius et al. |
| 2013/0190414 A1 | 7/2013 | Terheiden et al. |
| 2013/0334843 A1 | 12/2013 | Schweindl et al. |
| 2014/0155503 A1 | 6/2014 | Rynlz et al. |
| 2014/0179814 A1* | 6/2014 | Mooney ............. C08G 18/6677 521/131 |
| 2014/0357746 A1 | 12/2014 | Ngantung et al. |
| 2015/0025164 A1* | 1/2015 | Golini ................ C08G 18/4018 521/107 |
| 2017/0275310 A1 | 9/2017 | Okada et al. |
| 2017/0291983 A1 | 10/2017 | Narine et al. |
| 2017/0335057 A1 | 11/2017 | Tabor et al. |
| 2018/0117886 A1 | 5/2018 | Wilson |
| 2019/0119493 A1 | 4/2019 | Guo et al. |
| 2019/0119496 A1 | 4/2019 | Guo et al. |
| 2019/0309444 A1 | 10/2019 | Rudisill et al. |
| 2020/0062915 A1 | 2/2020 | Ramesh et al. |

FOREIGN PATENT DOCUMENTS

| | | |
|---|---|---|
| CN | 101440171 B | 7/2011 |
| CN | 202716812 U | 2/2013 |
| CN | 103694441 A | 4/2014 |
| CN | 102673089 B | 4/2015 |
| CN | 104690784 A | 6/2015 |
| DE | 2836553 A1 | 2/1980 |
| DE | 4318080 A1 | 4/1994 |
| DE | 102012205069 A1 | 10/2013 |
| DE | 102014206798 A1 | 10/2015 |
| JP | 4685113 B2 | 5/2011 |
| KR | 1019970010059 A | 3/1997 |
| KR | 1020040088434 A | 10/2004 |
| KR | 1020080097324 A | 11/2008 |
| KR | 100920823 B1 | 10/2009 |
| KR | 1020120053748 A | 5/2012 |
| KR | 101796511 B1 | 11/2017 |
| KR | 101812592 B1 | 1/2018 |
| WO | 02/42068 A1 | 5/2002 |
| WO | 2004080762 A3 | 5/2006 |
| WO | 2006091031 A1 | 8/2006 |
| WO | 20060112599 A1 | 10/2006 |
| WO | 2010063284 A2 | 6/2010 |
| WO | WO-2018202567 A1 * | 11/2018 ......... C08G 18/1808 |
| WO | 2020053211 A1 | 3/2020 |

OTHER PUBLICATIONS

Stepan Company, Stepan Polyester Polyols for Rigid Polyisocyanurate (PIR) and Polyurethane (PUR Foam) brochure.

* cited by examiner

ISOCYANATE-REACTIVE COMPOSITIONS, POLYURETHANE FOAMS FORMED THEREFROM, MULTI-LAYER COMPOSITE ARTICLES THAT INCLUDE SUCH FOAMS, AND METHODS FOR THEIR PREPARATION

FIELD

This specification pertains generally to isocyanate-reactive compositions, polyurethane foam-forming reaction mixtures, polyurethane foams, such as open-celled, cold-formed polyurethane foams, formed from such foam-forming reaction mixtures, and articles, such as multi-layer composite articles, formed from such polyurethane foams, as well as to methods for producing such articles. The multi-layered composite articles may be embodied as, for example, an automotive interior part, such as an automotive hoodliner or headliner.

BACKGROUND

Polyurethane foams are used in many applications. Among these is the production of automotive interior parts, such as automotive hoodliners and headliners. In such cases, the foam is part of a multi-layer composite that is simultaneously stiff and light in weight. To achieve such properties, the polyurethane foam must be low in density, must have sufficient strength and elasticity to resist breakage during forming, and be stiff enough to prevent the finished part from bending and sagging during finishing operations and final installation.

Polyurethane foams are produced by the reaction of an isocyanate-functional material with an isocyanate-reactive material, usually one or more polyols, in the presence of a blowing agent and other additives, such as catalyst and surfactant. Water can be used as a blowing agent, since it results in carbon dioxide gas upon reaction of isocyanate with the water For various reasons, but often sustainability reasons in particular, it is desirable to produce such polyurethane foams using renewable resources or recycled material. For example, polyurethane foams have been made using natural oils and/or polyols synthesized using natural oils, such as castor or soy bean oil, as starter molecules. The use of neat natural oils or natural oil polyols ("NOPs") in the production of polyurethane foams is not, however, without some drawbacks. Such materials are known to be odiferous and often produce foams lacking in important physical properties, unless highly modified by synthetic chain extension.

It would, therefore, be desirable to provide polyurethane foams with high levels of renewable and/or recycled content, without needing to rely largely on natural oils or NOPs, while retaining physical property characteristics of traditional water-blown polyurethane foams used in the production of automotive interior parts, such as automotive hoodliners and headliners.

SUMMARY

In certain respects, this specification relates to isocyanate-reactive compositions. The isocyanate-reactive compositions comprise: (a) a polyol blend; (b) a blowing agent composition; and (c) a catalyst. The polyol blend comprises: (i) a polyether polyol having a functionality of 2 to 6 and an OH number of 20 to 50 mg KOH/g, which is present in an amount of at least 30% by weight, based on total weight of the isocyanate-reactive composition; and (ii) an aromatic polyester polyol having a functionality of 1.5 to 3 and an OH number of 150 to 450 mg KOH/g, which is present in an amount of at least 40% by weight, based on total weight of the isocyanate-reactive composition. The blowing agent composition comprises water, the water being present in an amount of 1 to 20% by weight, based on total weight of the isocyanate-reactive composition and in an amount of at least 90% by weight, based on total weight of the blowing agent composition. In addition, the isocyanate-reactive composition has a green content of at least 30% by weight, based on total weight of the isocyanate-reactive composition.

In other respects, this specification relates to polyurethane foam-forming reaction mixtures that comprise: (a) a polyisocyanate; (b) a polyol blend; (c) a blowing agent composition; and (d) a catalyst. The polyisocyanate is present in an amount sufficient to provide an isocyanate index of 0.6 to 1.3. The polyol blend comprises: (i) a polyether polyol having a functionality of 2 to 6 and an OH number of 20 to 50 mg KOH/g, which is present in an amount of at least 10% by weight, based on total weight of polyol in the polyurethane foam-forming reaction mixture; and (ii) an aromatic polyester polyol having a functionality of 1.5 to 3 and an OH number of 150 to 450 mg KOH/g, which is present in an amount of at least 15% by weight, based on total weight of polyol in the polyurethane foam-forming reaction mixture. The blowing agent composition comprises water, the water being present in an amount of 0.5 to 10% by weight, based on total weight of the foam-forming reaction mixture and in an amount of at least 90% by weight, based on total weight of the blowing agent composition. In addition, the polyurethane foam-forming reaction mixture has a green content of at least 15% by weight, based on total weight of the polyurethane foam-forming reaction mixture.

In still other respects, this specification relates to multi-layered composite articles. that comprise: (a) a polyurethane foam core; (b) an adhesive layer in contact with and attached to at least one surface of the foam core; and (c) a fiber-containing layer in contact with and adhered to the adhesive layer. In the multi-layered composite articles, the polyurethane foam comprises the reaction product of a polyurethane foam-forming reaction mixture comprising: (1) a polyisocyanate; (2) a polyol blend; (3) a blowing agent composition; and (4) a catalyst. The polyisocyanate is present in an amount sufficient to provide an isocyanate index of 0.6 to 1.3. The polyol blend comprises: (i) a polyether polyol having a functionality of 2 to 6 and an OH number of 20 to 50 mg KOH/g, which is present in an amount of at least 10% by weight, based on total weight of polyol in the polyurethane foam-forming reaction mixture; and (ii) an aromatic polyester polyol having a functionality of 1.5 to 3 and an OH number of 150 to 450 mg KOH/g, which is present in an amount of at least 15% by weight, based on total weight of polyol in the polyurethane foam-forming reaction mixture. The blowing agent composition comprises water present in an amount of 0.5 to 10% by weight, based on total weight of the foam-forming reaction mixture and at least 90% by weight, based on total weight of the blowing agent composition. The polyurethane foam-forming reaction mixture has a green content of at least 15% by weight, based on total weight of the polyurethane foam-forming reaction mixture.

This specification further relates to, among other things, processes for producing such multi-layer composite articles. Such processes may comprise: (a) forming a multi-layer assembly by a process comprising: (1) sandwiching an open-celled, cold-formable polyurethane foam between fiber-reinforced mats to which an adhesive is applied, (2) covering one of the fiber-reinforced mats with a film, and (3)

covering the other fiber-reinforced mat with a textile fabric; (b) placing the multilayer assembly in a mold, (c) closing the mold and retaining the multi-layer assembly therein for a period long enough to cure the adhesive; and (d) removing the resulting molded article from the mold. In such processes, the open-celled, cold-formable polyurethane foam comprises the reaction product of a polyurethane foam-forming reaction mixture comprising: (1) a polyisocyanate; (2) a polyol blend; (3) a blowing agent composition; and (4) a catalyst, in which (A) the polyisocyanate is present in an amount sufficient to provide an isocyanate index of 0.6 to 1.3; (B) the polyol blend comprises: (i) a polyether polyol having a functionality of 2 to 6 and an OH number of 20 to 50 mg KOH/g, which is present in an amount of at least 10% by weight, based on total weight of polyol in the polyurethane foam-forming reaction mixture; and (ii) an aromatic polyester polyol having a functionality of 1.5 to 3 and an OH number of 150 to 450 mg KOH/g, which is present in an amount of at least 15% by weight, based on total weight of polyol in the polyurethane foam-forming reaction mixture; (C) the blowing agent composition comprises water, the water being present in an amount of 0.5 to 10% by weight, based on total weight of the foam-forming reaction mixture and in an amount of at least 90% by weight, based on total weight of the blowing agent composition; and (D) the polyurethane foam-forming reaction mixture has a green content of at least 15% by weight, based on total weight of the polyurethane foam-forming reaction mixture.

DETAILED DESCRIPTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used. Further, the use of a singular noun includes the plural, and the use of a plural noun includes the singular, unless the context of the usage requires otherwise.

As used herein, the term "functionality" refers to the average number of reactive hydroxyl groups, —OH, present per molecule of the polyol or polyol blend that is being described. In the production of polyurethane foams, the hydroxyl groups react with isocyanate groups, —NCO, that are attached to a polyisocyanate. The term "hydroxyl number" refers to the number of reactive hydroxyl groups available for reaction, and is expressed as the number of milligrams of potassium hydroxide equivalent to the hydroxyl content of one gram of the polyol (ASTM D4274-16). The term "equivalent weight" refers to the weight of a compound divided by its valence. For a polyol, the equivalent weight is the weight of the polyol that will combine with an isocyanate group, and may be calculated by dividing the molecular weight of the polyol by its functionality. The equivalent weight of a polyol may also be calculated by dividing 56,100 by the hydroxyl number of the polyol— Equivalent Weight (g/eq)=(56.1×1000)/OH number.

Aspects of this specification relate to isocyanate-reactive compositions and polyurethane foam-forming reaction mixtures that have a described amount of "green content". As used herein, "green content" refers to the sum of "renewable content" and "recycle content" in the composition being described. As used herein, "renewable content" refers to the sum of the percent by weight of water and bio-renewable material in the composition being described, based on total weight of that composition. As used herein, "bio-renewable material" refers to material from biological sources, i.e., material derived from living things, such as plants, algae, microbes, and animals. Specific examples of bio-renewable materials include, without limitation, plant-derived natural oils and the fatty acid components of the oils. As used herein "recycle content" refers to the percent by weight of post-consumer and/or post-industrial recycled material in the composition being described, based on total weight of that composition. Specific examples of recycled material include, without limitation, recycled thermoplastic polyester, recycled glycols, such as propylene glycol, ethylene glycol, and diethylene glycol, and recycled carbon dioxide (from an atmospheric gas trap or combustion gases, for example).

In some implementations, this specification is directed to isocyanate-reactive compositions and, in other implementations, to polyurethane foam-forming reaction mixtures. The isocyanate-reactive compositions and the polyurethane foam-forming reaction mixtures comprise a polyol blend. More specifically, the polyol blend comprises a polyether polyol having a functionality of 2 to 6, such as 2 to 4, 2.5 to 3.5, or 3, and an OH number of 20 to 50 mg KOH/g, such as 25 to 40 mg KOH/g or 28 to 34 mg KOH/g. Such polyether polyols can, for example, be produced by reaction of alkylene oxide, such as ethylene oxide and/or propylene oxide, with di- or higher functional polyols, such as trihydric polyols, specific examples of such di- and higher functional polyols include, but are not limited to, glycerol, trimethylolpropane, ethylene glycol, water, 1,2-propylene glycol, neopentyl glycol, and bisphenol.

The polyether polyol having a functionality of 2 to 6 and an OH number of 20 to 50 mg KOH/g may have a green content. More specifically, in some implementations, the green content of such a polyether polyol, which may, for example, arise due to the use of a renewable polyol starter, such as glycerol, to produce the polyether polyol, is up to 10% by weight, such as 1 to 10% by weight, 1 to 5% by weight or 1 to 2% by weight.

Moreover, in the isocyanate-reactive compositions of this specification, the polyether polyol having a functionality of 2 to 6 and an OH number of 20 to 50 mg KOH/g is present in an amount of at least 30% by weight, such as 30 to 50% by weight, 30 to 40% by weight or 35 to 40% by weight, based on total weight of the isocyanate-reactive composition. In addition, in the polyurethane foam-forming reaction mixtures of this specification, the polyether polyol having a functionality of 2 to 6 and an OH number of 20 to 50 mg KOH/g is present in an amount of at least 10% by weight, such as 10 to 20% by weight, or 15 to 20% by weight, based on total weight of the polyurethane foam-forming reaction mixture.

In addition, the polyol blend comprises an aromatic polyester polyol. The aromatic polyester polyol present in the polyol blend has an OH number of 150 to 450 mg KOH/g, such as 200 to 450 mg KOH/g, 240 to 410 mg KOH/g, or, in some cases, 240 to 400 mg KOH/g, and a functionality of 1.5 to 3, such as 1.9 to 2.5 or, in some cases, 2. Suitable aromatic polyester polyols include, for example, the reaction product of an aromatic diacid or anhydride with a suitable glycol or triol. For example, aromatic polyester polyols can be the reaction product of a glycol and/or triol, such as ethylene glycol, propylene glycol, butylene glycol, 1,3-butanediol, neopentyl glycol, diethylene glycol, dipropylene glycol, triethylene glycol, tripropylene glycol, glycerol, trimethylolethane, trimethylolpropane, pentanediol, hexanediol, heptanediol, 1,3- and 1,4-dimethylol cyclohexane, or a mixture of any two or more thereof with an aromatic diacid or aromatic anhydride, such as, for example, phthalic acid, isophthalic acid, terephthalic acid, phthalic anhydride, or a mixture of any two or more thereof.

The aromatic polyester polyol may have a green content. More specifically, in some implementations, the green content of such a polyester polyol, may, for example, arise due to the use of post-industrial recycled content in the production of the aromatic polyester polyol, such as the use of recycled thermoplastic polyester and/or recycled glycol. In some implementations, the green content of the aromatic polyester polyol is at least 15% by weight, at least 30% by weight, at least 40% by weight, or, in some cases, at least 50% by weight.

Some examples of the suitable aromatic polyester polyols, which include green content, include those available from Stepan Chemical under the Stepanpol trade name such as, for example, Stepanpol® PS-2502-A, Stepanpol® PS-3152, and Stepanpol® PS-4002.

Moreover, in the isocyanate-reactive compositions of this specification, the foregoing aromatic polyester polyol having a functionality of 1.5 to 3 and an OH number of 150 to 450 mg KOH/g is present in an amount of at least 40% by weight, such as 40 to 60% by weight, 40 to 50% by weight or 45 to 50% by weight, based on total weight of the isocyanate-reactive composition. In addition, in some implementations, in the polyurethane foam-forming reaction mixtures of this specification, the foregoing aromatic polyester polyol having a functionality of 1.5 to 3 and an OH number of 150 to 450 mg KOH/g is present in an amount of at least 15% by weight, such as 15 to 30% by weight, 15 to 25% by weight, or 15 to 20% by weight, based on total weight of the polyurethane foam-forming reaction mixture.

In certain implementations, the aromatic polyester polyol having a functionality of 1.5 to 3 and an OH number of 150 to 450 mg KOH/g and the polyether polyol having a functionality of 2 to 6 and an OH number of 20 to 50 mg KOH/g are present in the polyol blend in a weight ratio of at least 1:1, such as 1:1 to 2:1, or, in some cases 1:1 to 1.5:1.

In some implementations, the aromatic polyester polyol having a functionality of 1.5 to 3 and an OH number of 150 to 450 mg KOH/g and the polyether polyol having a functionality of 2 to 6 and an OH number of 20 to 50 are present in amount of amount of at least 80% by weight, at least 85% by weight, or at least 90% by weight, based on total weight of polyol in the polyol blend.

The polyol blend may, and often does, comprise one or more additional polyols, such as a chain extender and/or crosslinker containing at least two isocyanate-reactive groups and a molecular weight of 60 to 160, specific examples of which include, but are not limited to, glycerin, butanediol, ethylene glycol, diethylene glycol, propylene glycol, ethylenediamine, ethanolamine, triethanolamine, trimethylolpropane and pentaerythritol, including mixtures of two or more thereof. As will be appreciated, some such chain extenders and/or crosslinkers may have a green content due to their being a renewable material, such as glycerin, or a recycled material, such as may be the case with a glycol. In certain embodiments, such a chain extending agent and/or crosslinking agent is present in an amount of at least 1% by weight, such as 1 to 10% by weight or 5 to 10% by weight, based on total weight of polyol in the polyol blend.

Further, if desired, the polyol blend may comprise a natural oil or a NOP, though one feature of the inventions of this specification is that the presence of such material, particularly in large amounts, is not necessary. For example, if desired, any naturally occurring plant oil, plant oil product, animal-derived fat or oil, may be used. Examples of such natural oils include, for example, cashew oil, soybean oil, palm oil, palm kernel oil, castor oil, tall oil, canola oil, rapeseed oil, corn oil, jatropha oil, peanut oil, cottonseed oil, linseed oil, lard, tallow, bodied soybean oil, epoxidized soybean oil, camelina oil, lipids derived from algae, lesquerella oil, limnanthes (meadowfoam) oil and combinations of any thereof.

In some implementations, when used, a natural oil and/or NOP is present in an amount of at least 1% by weight, such as 1 to 10% by weight or 5 to 10% by weight, based on total weight of polyol in the polyol blend.

In certain implementations of the inventions of this specification, the polyol blend has a weighted-average functionality of 2 to 4, such as 2 to 3 or 2.2 to 2.8, and/or a weighted average OH number of 250 to 500 mg KOH/g, 250 to 400 mg KOH/g or 250 to 350 mg KOH/g.

The isocyanate-reactive compositions and polyurethane foam-forming reaction mixtures of this specification comprise a blowing agent composition. More specifically, the blowing agent composition comprises water present in an amount of at least 90% by weight, such as at least 95% by weight, at least 99% by weight, or, in some cases, 100% by weight, based on total weight of blowing agent composition.

Suitable blowing agents that may be used in combination with water, albeit in a relatively small amount, include any of a variety of physical blowing agents, for example. Examples of physical blowing agents are halogenated blowing agents, such as hydrofluoroolefins ("UFOs"), including hydrochlorofluoroolefins ("HFCOs"), chlorofluorocarbons ("CFCs"), hydrogen-containing chlorofluorocarbons ("HCFCs"), hydrofluorocarbons ("HFCs"), and hydrocarbons, such as butane, n-pentane, cyclopentane, hexane, and/or isopentane (i.e. 2-methylbutane). In some embodiments, however, the isocyanate-reactive compositions and polyurethane foam-forming reaction mixtures of this specification are substantially or, in some cases, completely free, of other physical blowing agents, such as other halogenated blowing agents, such as CFCs, HCFCs, HFCs and/or hydrocarbons, such as butane, n-pentane, cyclopentane, hexane, and/or isopentane (i.e. 2-methylbutane). As used herein, "substantially free" when used with reference to these physical blowing agents, means that the blowing agent is present, if at all, in an amount of less than 10% by weight, such no more than 5% by weight or no more than 1% by weight, based on total weight of the blowing agent composition.

In certain implementations, water is present in an amount of 1 to 20% by weight, 1 to 10% by weight, 2 to 8% by weight, or, in some cases 4 to 8% by weight, based on total weight of the isocyanate-reactive composition. In certain implementations, water is present in an amount of 0.5 to 10% by weight, 1 to 5% by weight, or 1 to 2% by weight, based on total weight of the polyurethane foam-forming reaction mixtures.

As previously indicated, the isocyanate-reactive compositions and polyurethane foam-forming reaction mixtures further comprise a catalyst. A wide variety of catalysts may be employed, such as tertiary amines, tertiary phosphines, various metal chelates, acid metal salts, strong bases, various metal alcoholates and phenolates, and metal salts of organic acids. For example, the catalyst may include an organometallic catalyst and/or tertiary amine catalyst.

Specific examples of suitable tertiary amine catalysts are, without limitation, pentamethyl diethylenetriamine, N,N-dimethyl cyclohexylamine, N,N',N"-tris(3-dimethylamino-propyl-)hexahydro triazine, tetramethyl ethylenediamine, tetraethylene diamine and benzyl dimethylamine, or a combination of any two or more thereof. Specific examples of suitable organometallic catalysts are, without limitation, dibutyltin dilaurate, dibutyltin diacetate, stannous octoate, potassium octoate, potassium acetate, or a combination thereof.

In some implementations, however, the catalyst itself has green content. For example, in some cases, the catalyst comprises a modified amine catalyst that has green content. More specifically, such modified amine catalyst may comprise the reaction product of (1) an amine, such as an amine with at least two amino groups, with at least one of the amino groups being a tertiary amino group with (2) a natural oil, or a derivative thereof, such as those having a molecular weight of at least 500 g/mol, such as 500 to 800 g/mol.

In certain implementations, the modified amine catalyst comprises the reaction products of (1) an amine, such as those represented by the formula $R_2$—N—$R'_x$—$NH_2$, where R and R', which may be the same or different, each represent a hydrocarbon and x represents an integer, such as N,N-dimethyl-propylene diamine, with (2) a natural oil, such as castor oil or any fatty acid, such as tall oil. Thus, in some implementations, a modified amine catalyst that is a reaction product of N,N-dimethyl-propylene diamine with tall oil is employed.

In some implementations, the catalyst, such as foregoing modified amine catalyst, is present in an amount of 1 to 5% by weight, such as 2 to 4% by weight, based on total weight of the isocyanate-reactive composition. In some implementations, the catalyst, such as the foregoing modified amine catalyst, is present in an amount of 0.5 to 2% by weight, such as 0.7 to 1.2% by weight, based on total weight of the polyurethane foam-forming reaction mixture.

Thus, as can be appreciated by the foregoing description, in some implementations, the necessary components of the isocyanate-reactive composition, i.e., the polyol blend, the blowing agent composition, and the catalyst may each individually have green content. In other words, in these implementations, the polyol blend, and, in some cases, each polyol of the polyol blend, has green content, the blowing agent composition has a green content, and, in some cases, consists solely of green content, and the catalyst has green content.

In some implementations, the isocyanate-reactive composition and polyurethane foam-forming reaction mixtures of this specification also comprise a surfactant. Any suitable surfactant can be used including organosilicon compounds, such as polysiloxane-polyalkylene block copolymers, such as a polyether-modified polysiloxane, polyethylene glycol ethers of long chain alcohols, tertiary amine or alkanolamine salts of long chain alkyl acid sulfate esters, alkylsulfonic esters, or alkylarylsulfonic acids. Such surfactants are employed in amounts sufficient to stabilize the foaming reaction mixture against collapse and the formation of large and uneven cells. In some embodiments, surfactant is utilized in an amount of 0.2 to 5.0% by weight or 0.5 to 1% by weight, based on total weight of the isocyanate-reactive composition.

Additional materials may optionally be included in the isocyanate-reactive compositions and/or the polyurethane foam-forming reaction mixtures of this specification, such as pigments, colorants, fillers, antioxidants, and flame retardants, among others.

As previously indicated, in some implementations, this specification relates to polyurethane foam-forming reaction mixtures that comprise a polyisocyanate. As used herein, the term "polyisocyanate" encompasses diisocyanates and higher functionality polyisocyanates.

Any of a variety of polyisocyanates may be employed, including aromatic, aliphatic, cycloaliphatic polyisocyanates and combinations thereof. Useful polyisocyanates include: diisocyanates, such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclo-hexane diisocyanate, isomers of hexahydro-toluene diisocyanate, isophorone diisocyanate, dicyclo-hexyl-methane diisocyanates, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-diphenyl-propane-4,4'-diisocyanate; triisocyanates such as 2,4,6-toluene triisocyanate; and polyisocyanates such as 4,4'-dimethyl-diphenylmethane-2,2',5,5'-tetraisocyanate and the polymethylene polyphenyl-polyisocyanates.

In some implementations, however, the polyisocyanate comprises diphenyl methane diisocyanate, polyphenyl polymethylene polyisocyanate, or a mixture thereof, such as a mixture of diphenyl methane diisocyanate and polyphenyl polymethylene polyisocyanate in which 30 to 90% by weight or 40 to 90% by weight of the total polyisocyanate is diphenyl methane diisocyanate and 10 to 70% or 10 to 50% by weight of the total polyisocyanate is polyphenyl polymethylene polyisocyanate. In some cases, 10 to 30% by weight, such as 15 to 25% by weight, of the diphenyl methane diisocyanate is 2,4'-diphenyl methane diisocyanate.

In certain embodiments, the polyol blend is mixed with the polyisocyanate component in a ratio by weight of isocyanate to polyol (an "A/B Ratio") of 130:100 to 200:100, such as 130:100 to 160:100. In some embodiments, polyisocyanate is present in an amount sufficient to provide a NCO/OH index of 0.6 to 1.3, such as 0.85 to 1.25, 1.0 to 1.2, or 1.1 to 1.2.

As indicated, the isocyanate-reactive compositions and polyurethane foam-forming reaction mixtures have green content. More specifically, the isocyanate-reactive composition has a green content of at least 30% by weight, such as 30 to 50% by weight or 35 to 50% by weight, based on total weight of the isocyanate-reactive composition. Also, the polyurethane foam-forming reaction mixture has a green content of at least 15% by weight, 15 to 30%, or 15 to 20%, based on total weight of the polyurethane foam-forming reaction mixture In fact, it was a surprising discovery that successful polyol blends could be formulated with enough renewable content to produce polyurethane foam-foaming reaction mixtures with at least 15% renewable content, even when stoichiometrically excess amount of isocyanate was used. More specifically, it was unexpected that polyol components with relatively lower renewable content could be largely or even completely replaced by components with relatively high renewable content while still producing a foam of having similar physical properties. Thus, the isocyanate-reactive compositions of this specification are no more complex than the control formulations, which can be advantageous in controlling inventory and simplifying the batching process. It was further observed that since equivalent weights of constituent components of the polyol blends described in this specification were higher than the control formulations, it was possible to use less isocyanate for the polymerization reaction, further enhancing the renewable benefit. Furthermore, while successful formulations were achieved without requiring the use of neat natural oils, such as soy oil, tall oil or castor oil, it was observed that such oils could nevertheless could be added as adjunct components if desired, further increasing the green content of the isocyanate-reactive composition.

Polyurethane foams can be produced by mixing the polyisocyanate with the polyol blend, such as, for example, by using a low-pressure foaming machine. A foam slab can be produced discontinuously, for example, by pouring the foamable mixture into a large box having a base area which corresponds to that of the article to be formed therefrom, e.g., a car roof. The polyurethane foams produced in accordance with this specification, in some implementations, have a density of 12 to 32 $kg/m^3$, such as 22 to 32 $kg/m^3$. In some cases, the reaction mixture is activated so that the foaming reaction begins after about 60 seconds, measured from emergence of the first amount from the mixing head (cream time). In some cases, after about 200 seconds, the foam sets and, after about 260 seconds, the blow-out process begins, i.e., the sudden evaporation of a mixture of steam and $CO_2$, leaving a number of small craters on the surface of the slab that is the outward sign that the foam cells have opened.

Thus, in some implementations, the polyurethane foams produced from the polyurethane foam-forming reaction mixtures of this specification are open-celled foams (60-94% by volume, ASTM-D-1940-42T) which are elastic and formable at room temperature. These foams may be used for the production of automotive interior parts, such as hoodliners and headliners having complicated shapes. The foams can have glass transition temperatures of approximately 150° C. and, hence, high heat resistance. The foams can be sufficiently rigid so that warm moldings can be removed without damage from a mold which has been heated at 130° to 140° C. In addition, the foams can have almost no resilience, so that edges which are tightly compressed to different extents retain their cross-section.

The polyurethane foams produced from the polyurethane foam-forming reaction mixtures of this specification may be particularly useful in producing multi-layered composite articles. Such multi-layered composite articles may comprise: (a) a polyurethane foam core; (b) an adhesive layer in contact with and attached to at least one surface of the foam core; and (c) a fiber-containing layer in contact with and adhered to the adhesive layer.

As indicated, in addition to the polyurethane foam core, which may be embodied in the foam of a foam sheet having two major (by "major" is meant the two surfaces of the foam sheet with the largest surfaces area) opposed surfaces, the multi-layered composite article may comprise an adhesive layer in contact with and attached to one or both major surfaces of the foam sheet, and a fiber containing layer in contact with and adhered to the adhesive layer(s), such as is the case with automotive headliners and hoodliners. In some implementations, the adhesive layer(s) comprise a polymer, examples of which include, but are not limited to, polyolefins (such as polyethylene and polypropylene), polyesters, nylons, poly(vinyl chloride), polyureas (such as the reaction product of water and an isocyanate), polyurethanes, polyacrylics, latex, styrene-butadiene polymers, nitrile-butadiene polymers, silicone polymers, mixtures thereof, copolymers thereof and interpenetrating networks thereof. In certain embodiments, each adhesive layer, if two or more adhesive layers are present, comprise the same polymer.

The fiber containing layer(s) can comprise woven or non-woven fibers. The fibers of the fiber containing layer(s) may be in the form of, for example, chopped fibers, such as synthetic or natural fibers, including glass fibers, for example.

The multi-layer composite articles may comprises additional layers, such as, for example, a textile cover layer which may be attached to a flexible foam layer that is adhered to one of the fiber containing layers and a scrim layer attached to the other fiber-containing layer, as is typical, for example, of an automotive headliner configuration.

Some implementations of this specification are also directed to process for making such multi-layer composite articles. These processes may comprise:: (1) sandwiching an open-celled polyurethane foam produced from a polyurethane foam-forming reaction mixtures of this specification between fiber-reinforced mats to which an adhesive is applied, (2) covering one of the fiber-reinforced mats with a film, and (3) covering the other fiber-reinforced mat with a textile fabric; (b) placing the multilayer assembly in a mold, (c) closing the mold and retaining the multi-layer assembly therein for a period long enough to cure the adhesive; and (d) removing the resulting molded article from the mold.

Various aspects of the subject matter described herein are set out in the following numbered clauses:

Clause 1. An isocyanate-reactive composition comprising: (a) a polyol blend comprising: (i) a polyether polyol having a functionality of 2 to 6 and an OH number of 20 to 50 mg KOH/g, which is present in an amount of at least 30% by weight, based on total weight of the isocyanate-reactive composition; and (ii) an aromatic polyester polyol having a functionality of 1.5 to 3 and an OH number of 150 to 450 mg KOH/g, which is present in an amount of at least 40% by weight, based on total weight of the isocyanate-reactive composition; (b) a blowing agent composition comprising water, the water being present in an amount of 1 to 20% by weight, based on total weight of the isocyanate-reactive composition and in an amount of at least 90% by weight, based on total weight of the blowing agent composition; and (c) a catalyst, wherein the isocyanate-reaction composition has a green content of at least 30% by weight, based on total weight of the isocyanate-reactive composition Clause 2. The isocyanate-reactive composition of clause 1, wherein the polyether polyol having a functionality of 2 to 6 and an OH number of 20 to 50 mg KOH/g has a functionality of 2 to 4, 2.5 to 3.5 or 3, and/or an OH number of 20 to 50 mg KOH/g, 25 to 40 mg KOH/g or 28 to 34 mg KOH/g.

Clause 3. The isocyanate-reactive composition of clause 1 to clause 2, wherein the polyether polyol having a functionality of 2 to 6 and an OH number of 20 to 50 mg KOH/g is the reaction product of alkylene oxide, such as ethylene oxide and/or propylene oxide, with a di- or higher functional polyol, glycerol, trimethylolpropane, ethylene glycol, water, 1,2-propylene glycol, neopentyl glycol, bisphenol, or a mixture thereof.

Clause 4. The isocyanate-reactive composition of one of clause 1 to clause 3, wherein the polyether polyol having a functionality of 2 to 6 and an OH number of 20 to 50 mg KOH/g has a green content of up to 10% by weight, 1 to 10% by weight, 1 to 5% by weight or 1 to 2% by weight.

Clause 5. The isocyanate-reactive composition of one of clause 1 to clause 4, wherein the polyether polyol having a functionality of 2 to 6 and an OH number of 20 to 50 mg KOH/g is present in an amount of at least 30% by weight, 30 to 50% by weight, 30 to 40% by weight or 35 to 40% by weight, based on total weight of the isocyanate-reactive composition.

Clause 6. The isocyanate-reactive composition of one of clause 1 to clause 5, wherein the aromatic polyester polyol has an OH number of 200 to 450 mg KOH/g, 240 to 410 mg KOH/g, or 240 to 400 mg KOH/g, and/or a functionality of 1.9 to 2.5 or 2.

Clause 7. The isocyanate-reactive composition of one of clause 1 to clause 6, wherein the aromatic polyester polyol is the reaction product of ethylene glycol, propylene glycol, butylene glycol, 1,3- butanediol, neopentyl glycol, diethylene glycol, dipropylene glycol, triethylene glycol, tripropylene glycol, glycerol, trimethylolethane, trimethylolpropane, pentanediol, hexanediol, heptanediol, 1,3- and 1,4-dimethylol cyclohexane, or a mixture of any two or more thereof with phthalic acid, isophthalic acid, terephthalic acid, phthalic anhydride, or a mixture of any two or more thereof.

Clause 8. The isocyanate-reactive composition of one of clause 1 to clause 7, wherein the aromatic polyester polyol has a green content of at least 15% by weight, at least 30% by weight, at least 40% by weight, or at least 50% by weight.

Clause 9. The isocyanate-reactive composition of one of clause 1 to clause 8, wherein the aromatic polyester polyol having a functionality of 1.5 to 3 and an OH number of 150 to 450 mg KOH/g is present in an amount of at least 40% by weight, 40 to 60% by weight, 40 to 50% by weight or 45 to 50% by weight, based on total weight of the isocyanate-reactive composition.

Clause 10. The isocyanate-reactive composition of one of clause 1 to clause 9, wherein the aromatic polyester polyol having a functionality of 1.5 to 3 and an OH number of 150 to 450 mg KOH/g and the polyether polyol having a functionality of 2 to 6 and an OH number of 20 to 50 mg KOH/g are present in the polyol blend in a weight ratio of at least 1:1, 1:1 to 2:1, or 1:1 to 1.5:1.

Clause 11. The isocyanate-reactive composition of one of clause 1 to clause 10, wherein the aromatic polyester polyol having a functionality of 1.5 to 3 and an OH number of 150 to 450 mg KOH/g and the polyether polyol having a functionality of 2 to 6 and an OH number of 20 to 50 are present in amount of amount of at least 80% by weight, at least 85% by weight, or at least 90% by weight, based on total weight of polyol in the polyol blend.

Clause 12. The isocyanate-reactive composition of one of clause 1 to clause 11, wherein the polyol blend further comprises a chain extending agent and/or crosslinking agent containing at least two isocyanate-reactive groups and having a molecular weight of from 60 to 160, such as glycerin, butanediol, ethylene glycol, diethylene glycol, propylene glycol, ethylenediamine, ethanolamine, triethanolamine, trimethylolpropane and pentaerythritol, or a mixture of two or more thereof.

Clause 13. The isocyanate-reactive composition of clause 12, wherein the chain extending agent and/or crosslinking agent is present in an amount of at least 1% by weight, 1 to 10% by weight or 5 to 10% by weight, based on total weight of the polyol blend.

Clause 14. The isocyanate-reactive composition of one of clause 1 to clause 13, wherein the polyol blend comprises a natural oil or a NOP, such as cashew oil, soybean oil, palm oil, palm kernel oil, castor oil, tall oil, canola oil, rapeseed oil, corn oil, jatropha oil, peanut oil, cottonseed oil, linseed oil, lard, tallow, bodied soybean oil, epoxidized soybean oil, camelina oil, lipids derived from algae, lesquerella oil, limnanthes (meadowfoam) oil, or a combination of any thereof.

Clause 15. The isocyanate-reactive composition of clause 14, wherein the natural oil and/or NOP is present in an amount of at least 1% by weight, 1 to 10% by weight or 5 to 10% by weight, based on total weight of the polyol blend.

Clause 16. The isocyanate-reactive composition of one of clause 1 to clause 15, wherein the polyol blend has a weighted-average functionality of 2 to 4, 2 to 3 or 2.2 to 2.8, and/or a weighted average OH number of 250 to 500 mg KOH/g, 250 to 400 mg KOH/g or 250 to 350 mg KOH/g.

Clause 17. The isocyanate-reactive composition of one of clause 1 to clause 16, wherein water is present in the blowing agent composition in an amount of at least 95% by weight, at least 99% by weight, or 100% by weight, based on total weight of blowing agent composition.

Clause 18. The isocyanate-reactive composition of one of clause 1 to clause 17, wherein water is present in an amount of 1 to 10% by weight, 2 to 8% by weight, or 4 to 8% by weight, based on total weight of the isocyanate-reactive composition.

Clause 19. The isocyanate-reactive composition of one of clause 1 to clause 18, wherein the catalyst comprises a modified amine catalyst that has green content.

Clause 20. The isocyanate-reactive composition of clause 19, wherein the modified amine catalyst may comprise the reaction product of (1) an amine, such as an amine with at least two amino groups, with at least one of the amino groups being a tertiary amino group with (2) a natural oil, or a derivative thereof, such as those having a molecular weight of at least 500 g/mol or 500 to 800 g/mol.

Clause 21. The isocyanate-reactive composition of clause 20, wherein the modified amine catalyst comprises the reaction product of (1) an amine represented by the formula $R_2$—N—$R'_x$—$NH_2$, where R and R', which may be the same or different, each represent a hydrocarbon and x represents an integer, such as N,N-dimethyl-propylene diamine, with (2) a natural oil, such as castor oil or any fatty acid, such as tall oil, such as the reaction product of N,N-dimethyl-propylene diamine with tall oil.

Clause 22. The isocyanate-reactive composition of one of clause 1 to clause 21, wherein the catalyst is present in an amount of 1 to 5% by weight, such as 2 to 4% by weight, based on total weight of the isocyanate-reactive composition.

Clause 23. The isocyanate-reactive composition of one of clause 1 to clause 22, wherein each of the polyol blend, the blowing agent composition, and the catalyst may has green content.

Clause 24. The isocyanate-reactive composition of one of clause 1 to clause 23, wherein the isocyanate-reactive composition has a green content of as 30 to 50% by weight or 35 to 50% by weight, based on total weight of the isocyanate-reactive composition.

Clause 25. A polyurethane foam-forming reaction mixture comprising: (a) a polyisocyanate present in an amount sufficient to provide an isocyanate index of 0.6 to 1.3; (b) a polyol blend comprising: (i) a polyether polyol having a functionality of 2 to 6 and an OH number of 20 to 50 mg KOH/g, which is present in an amount of at least 10% by weight, based on total weight of polyol in the polyurethane foam-forming reaction mixture; and (ii) an aromatic polyester polyol having a functionality of 1.5 to 3 and an OH number of 150 to 450 mg KOH/g, which is present in an amount of at least 15% by weight, based on total weight of polyol in the polyurethane foam-forming reaction mixture; (c) a blowing agent composition comprising water, the water being present in an amount of 0.5 to 10% by weight, based on total weight of the foam-forming reaction mixture and in an amount of at least 90% by weight, based on total weight of the blowing agent composition; and (d) a catalyst, wherein the polyurethane foam-forming reaction mixture has a green content of at least 15% by weight, based on total weight of the polyurethane foam-forming reaction mixture.

Clause 26. The polyurethane foam-forming reaction mixture of clause 25, wherein the polyisocyanate comprises diphenyl methane diisocyanate, polyphenyl polymethylene polyisocyanate or a mixture thereof, such as where the polyisocyanate comprises a mixture of diphenyl methane diisocyanate and polyphenyl polymethylene polyisocyanate in which 30 to 90% by weight or 40 to 90% by weight of the total polyisocyanate is diphenyl methane diisocyanate and 10 to 70% or 10 to 50% by weight of the total polyisocyanate is polyphenyl polymethylene polyisocyanate, such as where 10 to 30% by weight or 15 to 25% by weight of the diphenyl methane diisocyanate is 2,4'-diphenyl methane diisocyanate.

Clause 27. The polyurethane foam-forming reaction mixture of clause 25 or clause 26, wherein the polyisocyanate and polyol blend are present in a ratio by weight of polyisocyanate to polyol of 130:100 to 200:100, or 130:100 to 160:100.

Clause 28. The polyurethane foam-forming reaction mixture of one of clause 25 to clause 27, wherein the index 0.85 to 1.25, 1.0 to 1.2, or 1.1 to 1.2.

Clause 29. The polyurethane foam-forming reaction mixture of one of clause 25 to clause 28, wherein the polyether polyol having a functionality of 2 to 6 and an OH number of 20 to 50 mg KOH/g has a functionality of 2 to 4, 2.5 to 3.5, or 3, and/or an OH number of 20 to 50 mg KOH/g, 25 to 40 mg KOH/g, or 28 to 34 mg KOH/g.

Clause 30. The polyurethane foam-forming reaction mixture of one of clause 25 to clause 29, wherein the polyether polyol having a functionality of 2 to 6 and an OH number of 20 to 50 mg KOH/g is the reaction product of alkylene oxide, such as ethylene oxide and/or propylene oxide, with a di- or higher functional polyol, glycerol, trimethylolpropane, ethylene glycol, water, 1,2-propylene glycol, neopentyl glycol, bisphenol, or a mixture thereof.

Clause 31. The polyurethane foam-forming reaction mixture of one of clause 25 to clause 30, wherein the polyether polyol having a functionality of 2 to 6 and an OH number of 20 to 50 mg KOH/g has a green content of up to 10% by weight, 1 to 10% by weight, 1 to 5% by weight, or 1 to 2% by weight.

Clause 32. The polyurethane foam-forming reaction mixture of one of clause 25 to clause 31, wherein the polyether polyol having a functionality of 2 to 6 and an OH number of 20 to 50 mg KOH/g is present in an amount of at least 10% by weight, such as 10 to 20% by weight, or 15 to 20% by weight, based on total weight of the polyurethane foam-forming reaction mixture.

Clause 33. The polyurethane foam-forming reaction mixture of one of clause 25 to clause 32, wherein the aromatic polyester polyol has an OH number of 200 to 450 mg KOH/g, 240 to 410 mg KOH/g, or 240 to 400 mg KOH/g, and/or a functionality of 1.9 to 2.5, or 2.

Clause 34. The polyurethane foam-forming reaction mixture of one of clause 25 to clause 33, wherein the aromatic polyester polyol is the reaction product of ethylene glycol, propylene glycol, butylene glycol, 1,3-butanediol, neopentyl glycol, diethylene glycol, dipropylene glycol, triethylene glycol, tripropylene glycol, glycerol, trimethylolethane, trimethylolpropane, pentanediol, hexanediol, heptanediol, 1,3- and 1,4-dimethylol cyclohexane, or a mixture of any two or more thereof with phthalic acid, isophthalic acid, terephthalic acid, phthalic anhydride, or a mixture of any two or more thereof.

Clause 35. The polyurethane foam-forming reaction mixture of one of clause 25 to clause 34, wherein the aromatic polyester polyol has a green content of at least 15% by weight, at least 30% by weight, at least 40% by weight, or at least 50% by weight.

Clause 36. The polyurethane foam-forming reaction mixture of one of clause 25 to clause 35, wherein the aromatic polyester polyol having a functionality of 1.5 to 3 and an OH number of 150 to 450 mg KOH/g is present in an amount of at least 15% by weight, such as 15 to 30% by weight, 15 to 25% by weight, or 15 to 20% by weight, based on total weight of the polyurethane foam-forming reaction mixture.

Clause 37. The polyurethane foam-forming reaction mixture of one of clause 25 to clause 36, wherein the aromatic polyester polyol having a functionality of 1.5 to 3 and an OH number of 150 to 450 mg KOH/g and the polyether polyol having a functionality of 2 to 6 and an OH number of 20 to 50 mg KOH/g are present in the polyol blend in a weight ratio of at least 1:1, 1:1 to 2:1, or 1:1 to 1.5:1.

Clause 38. The polyurethane foam-forming reaction mixture of one of clause 25 to clause 37, wherein the aromatic polyester polyol having a functionality of 1.5 to 3 and an OH number of 150 to 450 mg KOH/g and the polyether polyol having a functionality of 2 to 6 and an OH number of 20 to 50 are present in amount of amount of at least 80% by weight, at least 85% by weight, or at least 90% by weight, based on total weight of polyol in the polyol blend.

Clause 39. The polyurethane foam-forming reaction mixture of one of clause 25 to clause 38, wherein the polyol blend further comprises a chain extending agent and/or crosslinking agent containing at least two isocyanate-reactive groups and having a molecular weight of from 60 to 160, such as glycerin, butanediol, ethylene glycol, diethylene glycol, propylene glycol, ethylenediamine, ethanolamine, triethanolamine, trimethylolpropane and pentaerythritol, or a mixture of two or more thereof.

Clause 40. The polyurethane foam-forming reaction mixture of clause 39, wherein the chain extending agent and/or crosslinking agent is present in an amount of at least 1% by weight, 1 to 10% by weight, or 5 to 10% by weight, based on total weight of the polyol blend.

Clause 41. The polyurethane foam-forming reaction mixture of one of clause 25 to clause 40, wherein the polyol blend comprises a natural oil or a NOP, such as cashew oil, soybean oil, palm oil, palm kernel oil, castor oil, tall oil, canola oil, rapeseed oil, corn oil, jatropha oil, peanut oil, cottonseed oil, linseed oil, lard, tallow, bodied soybean oil, epoxidized soybean oil, camelina oil, lipids derived from algae, lesquerella oil, limnanthes (meadowfoam) oil, or a combination of any thereof.

Clause 42. The polyurethane foam-forming reaction mixture of clause 41, wherein the natural oil and/or NOP is present in an amount of at least 1% by weight, 1 to 10% by weight, or 5 to 10% by weight, based on total weight of the polyol blend.

Clause 43. The polyurethane foam-forming reaction mixture of one of clause 25 to clause 42, wherein the polyol blend has a weighted-average functionality of 2 to 4, 2 to 3 or 2.2 to 2.8, and/or a weighted average OH number of 250 to 500 mg KOH/g, 250 to 400 mg KOH/g, or 250 to 350 mg KOH/g.

Clause 44. The polyurethane foam-forming reaction mixture of one of clause 25 to clause 43, wherein water is present in the blowing agent composition in an amount of at least 95% by weight, at least 99% by weight, or 100% by weight, based on total weight of blowing agent composition.

Clause 45. The polyurethane foam-forming reaction mixture of one of clause 25 to clause 44, wherein water is present in an amount of 0.5 to 10% by weight, 1 to 5% by weight, or 1 to 2% by weight, based on total weight of the polyurethane foam-forming reaction mixture.

Clause 46. The polyurethane foam-forming reaction mixture of one of clause 25 to clause 45, wherein the catalyst comprises a modified amine catalyst that has green content.

Clause 47. The polyurethane foam-forming reaction mixture of clause 46, wherein the modified amine catalyst may comprise the reaction product of (1) an amine, such as an amine with at least two amino groups, with at least one of the amino groups being a tertiary amino group with (2) a natural oil, or a derivative thereof, such as those having a molecular weight of at least 500 g/mol or 500 to 800 g/mol.

Clause 48. The polyurethane foam-forming reaction mixture of clause 47, wherein the modified amine catalyst comprises the reaction product of (1) an amine represented by the formula $R_2$—N—$R'_x$—$NH_2$, where R and R', which may be the same or different, each represent a hydrocarbon and x represents an integer, such as N,N-dimethyl-propylene diamine, with (2) a natural oil, such as castor oil or any fatty acid, such as tall oil, such as the reaction product of N,N-dimethyl-propylene diamine with tall oil.

Clause 49. The polyurethane foam-forming reaction mixture of one of clause 25 to clause 48, wherein the catalyst is present in an amount of 0.5 to 2% by weight, such as 0.7 to 1.2% by weight, based on total weight of the polyurethane foam-forming reaction mixture.

Clause 50. The polyurethane foam-forming reaction mixture of one of clause 25 to clause 49, wherein each of the polyol blend, the blowing agent composition, and the catalyst may has green content.

Clause 51. The polyurethane foam-forming reaction mixture of one of clause 25 to clause 50, wherein the polyurethane foam-forming reaction mixture has a green content of at least 15% by weight, 15 to 30%, or 15 to 20%, based on total weight of the polyurethane foam-forming reaction mixture.

Clause 52. A polyurethane foam formed from the polyurethane foam-forming composition of one of clause 25 to clause 51.

Clause 53. The polyurethane foam of clause 52, wherein the polyurethane foam has a density of 12 to 32 kg/m$^3$ or 22 to 32 kg/m$^3$.

Clause 54. The polyurethane foam of clause 52 or clause 53, wherein the polyurethane foam has an open-cell content of 60-94% by volume, according to ASTM-D-1940-42T.

Clause 55. A multi-layered composite article comprising: (a) a polyurethane foam core; (b) an adhesive layer in contact with and attached to at least one surface of the foam core; and (c) a fiber-containing layer in contact with and adhered to the adhesive layer, wherein the polyurethane foam core comprises the polyurethane foam of one of clause 52 to clause 54.

Clause 56. The multi-layered composite article of clause 55, wherein the adhesive layer comprises a polyolefin (such as polyethylene and polypropylene), a polyester, a nylon, a poly(vinyl chloride), a polyurea (such as the reaction product of water and an isocyanate), a polyurethane, a polyacrylic, a latex, a styrene-butadiene polymer, a nitrile-butadiene polymer, a silicone polymer, a mixture thereof, a copolymer thereof, or a interpenetrating network thereof.

Clause 57. The multi-layered composite article of clause 55 or clause 56, wherein the fiber containing layer comprises glass fibers.

Clause 58. The multi-layered composite article of one of clause 55 to clause 57, wherein the multi-layer composite article comprises a textile cover layer attached to a flexible foam layer that is adhered to one of the fiber containing layers and a scrim layer attached to the other fiber-containing layer.

Clause 59. A process for making the multi-layer composite article of one of clause 55 to clause 58 comprising:: (1) sandwiching an open-celled polyurethane foam produced from a polyurethane foam-forming reaction mixtures of this specification between fiber-reinforced mats to which an adhesive is applied, (2) covering one of the fiber-reinforced mats with a film, and (3) covering the other fiber-reinforced mat with a textile fabric; (b) placing the multilayer assembly in a mold, (c) closing the mold and retaining the multi-layer assembly therein for a period long enough to cure the adhesive; and (d) removing the resulting molded article from the mold.

The non-limiting and non-exhaustive examples that follow are intended to further describe various non-limiting and non-exhaustive embodiments without restricting the scope of the embodiments described in this specification.

EXAMPLES

Foam-forming reaction mixtures were prepared using the ingredients and amounts (in parts by weight) set forth in the Tables 1-3 below. Examples 1-9 are comparative examples and Examples 10-14 are inventive examples. The following materials were used:

POLYOL 1: a glycerin-initiated polyether polyol (with an oxide block of 83% propylene oxide and 17% ethylene oxide), having a functionality of 3, an OH number of 28 mg KOH/g, and a green content of 1.5% by weight, based on total weight of POLYOL 1;

POLYOL 2: a propylene glycol-initiated polyether polyol (with an oxide block of 100% propylene oxide), having a functionality of 2, an OH number of 515 mg KOH/g, and a green content of 34% by weight, based on total weight of POLYOL 2;

POLYOL 3: a glycerin-initiated polyether polyol (with an oxide block of 100% propylene oxide), having a functionality of 3, an OH number of 470 mg KOH/g, and a green content of 26% by weight, based on total weight of POLYOL 3;

POLYOL 4: an aromatic polyester polyol having a functionality of 2, an OH number of 240 mg KOH/g, and a minimum post-industrial recycled content of 50% by weight, based on total weight of POLYOL 4;

POLYOL 5: an aromatic polyester polyol having a functionality of 2, an OH number of 315 mg KOH/g, and a minimum post-industrial recycled content of 55% by weight, based on total weight of POLYOL 5;

POLYOL 6: an aromatic polyester polyol having a functionality of 2, an OH number of 400 mg KOH/g, and a minimum post-industrial recycled content of 64% by weight, based on total weight of POLYOL 6;

CATALYST 1: a modified amine catalyst which is the reaction product of tall oil with N,N-dimethyl-propylene diamine of the type described in U.S. Patent Application Publication No. 2008/0227879 A1;

CATALYST 2: N-(3-dimethylaminopropyl)-N,N-diisopropanolamine, commercially available as Jeffcat® DPA from Huntsman;

SURFACTANT 1: silicone surfactant, Niax Silicone L-1260 from Momentive Performance Materials;

SURFACTANT 2: a blend (4/6) of Tegostab® B 8526 and B 8523, each from Evonik;

COLORANT 1: Colormatch® DR2205 black pigment from Chromoflo Technologies;

COLORANT 2: Pigment paste, REPITAN Black 99430;

ISOCYANATE: a mixture of diphenyl methane diisocyanate and a polyphenyl polymethylene polyisocyanate in which from 40 to 90% by weight of the total polyisocyanate is a diphenyl methane diisocyanate and from 10 to 50% of the total polyisocyanate is a polyphenyl polymethylene polyisocyanate.

Lab Procedure for Producing Foam Blocks

To prepare foams, the "B-side" (prepared by mixing all ingredients except the ISOCYANATE) and the ISOCYANATE were each conditioned for 16 hours at 25° C. The container used for the reaction was a 13½"×13½"×12" tall wood box in which the sides were lined with polyethylene film, and a snug fitting cardboard tray was placed in the bottom of the box. A Foamat® digital data collection unit was used to monitor the foaming reaction in which a laser was used to monitor rate of rise and rise height of the foam, pressure transducers were used to monitor foaming pressure, and a thermocouple was used to monitor foam exotherm. For each run: (1) ambient conditions were recorded (typically 20° C. and 50% relative humidity) and the data collection suite initialized; (2) a suitable amount of "B-side" was weighed in a 1.5-liter plastic container; (3) the desired amount of ISOCYANATE was then added to the same container and the components were mixed together for 20 seconds at 2,800 rpm using a six-vane fin mixer with a 2½" diameter impeller; and (4) 1,100 grams of the homogenized liquid was poured into the box. The actual amount charged to the box was recorded. In addition to the digital data, cream time and gel time was manually observed and recorded. After the gel time, the crown of the foam was observed for degas. Time of degas initiation and cessation was recorded and scored on a scale of 1-10, with 1 being very poor and 10 being very robust. After 15 minutes, the material inside the box was re-weighed and weight loss was calculated. The foam crown continued to be monitored for tack-free time. After 30 minutes, the foam/liner/tray assembly was removed from the box; and after waiting at least 5 minutes, the liner and tray were removed from the reacted foam bun. The foam bun was then left to sit for at least 16 hours at ambient conditions, then cut down to 11"×11"×6" tall using a bandsaw. The resulting block was weighed and the density calculated and recorded in kg/m$^3$. The block was then sliced into 10 mm thick sheets for physical property testing. Results are set forth below.

TABLE 1

| INGREDIENT | Example | | | | |
|---|---|---|---|---|---|
| | 1 | 2 | 3 | 4 | 5 |
| POLYOL 1 | 38.70 | 39.10 | 39.00 | 36.82 | 38.85 |
| POLYOL 2 | 18.00 | 28.00 | 18.00 | 28.00 | 28.00 |
| POLYOL 3 | 38.35 | 18.70 | 27.75 | 20.00 | 20.00 |
| Glycerin | 7.60 | 7.60 | 7.60 | 6.00 | 6.00 |
| CATALYST 1 | 2.75 | 2.20 | 2.75 | 2.80 | — |
| CATALYST 2 | — | — | — | — | 0.700 |
| SURFACTANT 1 | 0.30 | 0.30 | .30 | 0.230 | 0.30 |
| COLORANT | — | — | 0.50 | 0.50 | 0.50 |
| Water | 4.30 | 4.10 | 4.10 | 5.65 | 5.65 |
| TOTAL | 100.00 | 100.00 | 100.00 | 100.00 | 100.00 |
| eq/formula weight | 1.1481 | 1.1367 | 1.1211 | 1.2668 | 1.2742 |
| eq/100 g × OH | 1.1481 | 1.1367 | 1.1211 | 1.2668 | 1.2742 |
| Index | 1.07 | 1.12 | 1.13 | 1.09 | 1.08 |
| ISOCYANATE | 160 | 165 | 165 | 180 | 180 |
| Green Content ("B-side")[1] | 27.3 | 27.8 | 27.0 | 28.3 | 27.0 |
| Green Content (Foam-forming reaction mixture) | 10.5 | 10.5 | 10.2 | 10.1 | 9.6 |
| FOAM PROPERTIES | | | | | |
| Foam Density (kg/m$^3$) | 29.7 | 32.5 | 32.7 | 25.7 | 24.7 |
| Flexural Strength (psi) | 16.2 | 21.1 | 21.1 | 13.4 | 10.9 |
| Flexural Modulus (psi) | 315 | 424 | 439 | 269 | 204 |
| Compressive Stress at Yield (psi) | 22.6 | 25.6 | 27.2 | 17.9 | 16.2 |
| Compressive Deflection at Yield (%) | 29.6 | 25.5 | 23.5 | 28.4 | 33.3 |
| 50% Compressive Recovery (%) | 83.4 | 80.7 | 80.1 | 80.2 | 81.8 |
| Tensile Strength (psi) | 36.4 | 40.8 | 35.6 | 31.0 | 28.5 |
| Tensile Elongation (%) | 28.5 | 24.6 | 19.0 | 28.5 | 33.9 |
| Die C Tear Resistance (pli) | 5.6 | 6.5 | 6.2 | 4.9 | 4.7 |

[1]"B-side" refers to all ingredients except for the ISOCYANATE.

TABLE 2

| INGREDIENT | Example | | | |
|---|---|---|---|---|
| | 6 | 7 | 8 | 9 |
| POLYOL 1 | 37.25 | 37.25 | 37.25 | 37.25 |
| POLYOL 3 | 30.00 | 30.00 | 30.00 | 30.00 |
| POLYOL 2 | 18.00 | 18.00 | 18.00 | 18.00 |
| Glycerin | 6.00 | 6.00 | 6.00 | 6.00 |
| Tall Oil | 0.00 | 1.00 | 2.00 | 5.00 |
| SURFACTANT | 0.30 | 0.30 | 0.30 | 0.30 |
| CATALYST 1 | 2.80 | 2.80 | 2.80 | 2.80 |
| Water | 5.65 | 5.65 | 5.65 | 5.65 |
| TOTAL | 100.00 | 101.00 | 102.00 | 105.00 |
| eq/formula weight | 1.2591 | 1.2591 | 1.2591 | 1.2591 |
| eq/100 g × OH | 1.2591 | 1.2466 | 1.2344 | 1.1991 |
| index | 1.090 | 1.090 | 1.090 | 1.090 |
| ISOCYANATE | 179 | 177 | 176 | 171 |
| Green Content ("B-side")[1] | 27.5 | 28.5 | 29.5 | 32.5 |
| Green Content (Foam-forming reaction mixture) | 9.9 | 10.3 | 10.7 | 12.0 |
| FOAM PROPERTIES | | | | |
| Foam Density (kg/m$^3$) | 25.6 | 25.2 | 25.9 | N/A[2] |
| Flexural Strength (psi) | 11.6 | 10.6 | 10.9 | — |
| Flexural Modulus (psi) | 222 | 200 | 204 | — |
| Compressive Stress at Yield (psi) | 18.3 | 18.2 | 18.1 | — |
| Compressive Deflection at Yield (%) | 29.3 | 33.1 | 30.1 | — |
| 50% Compressive Recovery (%) | 81.3 | 80.8 | 80.2 | — |
| Tensile Strength (psi) | 29.6 | 29.0 | 30.1 | — |
| Tensile Elongation (%) | 27.1 | 28.5 | 28.2 | — |
| Die C Tear Resistance (pli) | 4.3 | 4.4 | 4.5 | — |

[1]"B-side" refers to all ingredients except for the ISOCYANATE
[2]Foam shrunk and was not tested for physical properties.

TABLE 3

| INGREDIENT | Example 10 | 11 | 12 | 13 | 14 |
|---|---|---|---|---|---|
| POLYOL 1 | 39.85 | 39.85 | 39.85 | 34.85 | 34.85 |
| POLYOL 4 | 46.00 | — | — | — | — |
| POLYOL 5 | — | 46.00 | — | — | — |
| POLYOL 6 | — | — | 46.00 | 41.00 | 41.00 |
| Castor Oil | — | — | — | 5.00 | — |
| Tall Oil | — | — | — | — | 5.00 |
| COLORANT 2 | — | — | — | — | — |
| Glycerin | 7.00 | 7.00 | 7.00 | 7.00 | 7.00 |
| CATALYST 1 | 2.40 | 2.40 | 2.40 | 2.40 | 2.40 |
| Water | 4.10 | 4.10 | 4.10 | 4.10 | 4.10 |
| SURFACTANT 2 | 0.30 | 0.30 | 0.30 | 0.30 | 0.30 |
| SURFACTANT 1 | 0.35 | 0.35 | 0.35 | 0.35 | 0.35 |
| TOTAL | 100.00 | 100.00 | 100.00 | 100.00 | 100.00 |
| eq/formula weight | 0.9007 | 0.9625 | 1.0280 | 1.0402 | 1.0255 |
| eq/100 g × OH | 0.9007 | 0.9625 | 1.0280 | 1.0402 | 1.0255 |
| Index | 1.130 | 1.130 | 1.130 | 1.130 | 1.130 |
| ISOCYANATE | 133 | 142 | 152 | 153 | 151 |
| Green Content ("B-side")[1] | 35.9 | 38.2 | 42.3 | 47.3 | 47.3 |
| Green Content (Foam-forming reaction mixture) | 15.4 | 15.8 | 16.8 | 18.7 | 18.8 |
| FOAM PROPERTIES | | | | | |
| Foam Density (kg/m$^3$) | 31.1 | 33.1 | 33.7 | 33.7 | 33.0 |
| Flexural Strength (psi) | 13.2 | 18.2 | 20.4 | 21.7 | 19.4 |
| Flexural Modulus (psi) | 272 | 359 | 458 | 490 | 434 |
| Compressive Stress at Yield (psi) | 25.0 | 27.4 | 27.4 | 29.0 | 26.2 |
| Compressive Deflection at Yield (%) | 29.1 | 28.2 | 24.0 | 24.2 | 24.6 |
| 50% Compressive Recovery (%) | 78.8 | 81.1 | 79.4 | 78.8 | 80.1 |
| Tensile Strength (psi) | 25.1 | 28.8 | 31.5 | 36.0 | 31.3 |
| Tensile Elongation (%) | 15.9 | 12.1 | 11.4 | 13.6 | 13.1 |
| Die C Tear Resistance (pli) | 4.7 | 4.1 | 4.8 | 5.2 | 5.1 |

[1]"B-side" refers to all ingredients except for the ISOCYANATE.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An isocyanate-reactive composition comprising:
   (a) a polyol blend comprising:
      (i) a polyether polyol having a functionality of 2 to 6 and an OH number of 20 to 50 mg KOH/g, which is present in an amount of at least 30% by weight, based on total weight of the isocyanate-reactive composition and which is a reaction product of an alkylene oxide and a di- or higher functional renewable polyol starter; and
      (ii) an aromatic polyester polyol having a functionality of 1.5 to 3 and an OH number of 150 to 450 mg KOH/g, which is present in an amount of at least 40% by weight, based on total weight of the isocyanate-reactive composition;
   (b) a blowing agent composition comprising water, the water being present in an amount of 1 to 20% by weight, based on total weight of the isocyanate-reactive composition and in an amount of at least 90% by weight, based on total weight of the blowing agent composition; and
   (c) a catalyst,
   wherein the isocyanate-reactive composition has a green content of at least 30% by weight, based on total weight of the isocyanate-reactive composition.

2. The isocyanate-reactive composition of claim 1, wherein:
   (i) the polyether polyol having a functionality of 2 to 6 and an OH number of 20 to 50 mg KOH/g has a functionality of 2 to 4 and an OH number of 28 to 34 mg KOH/g; and
   (ii) the aromatic polyester polyol having a functionality of 1.5 to 3 and an OH number of 150 to 450 mg KOH/g has an OH number of 240 to 410 mg KOH/g, and a functionality of 1.9 to 2.5.

3. The isocyanate-reactive composition of claim 1, wherein:
   (i) the polyether polyol having a functionality of 2 to 6 and an OH number of 20 to 50 mg KOH/g is present in an amount of 30 to 50% by weight, based on total weight of the isocyanate-reactive composition; and
   (ii) the aromatic polyester polyol having a functionality of 1.5 to 3 and an OH number of 150 to 450 mg KOH/g is present in an amount of 40 to 60% by weight, based on total weight of the isocyanate-reactive composition.

4. The isocyanate-reactive composition of claim 1, wherein the aromatic polyester polyol having a functionality of 1.5 to 3 and an OH number of 150 to 450 mg KOH/g has a green content of at least 30% by weight.

5. The isocyanate-reactive composition of claim 1, wherein the aromatic polyester polyol having a functionality of 1.5 to 3 and an OH number of 150 to 450 mg KOH/g and the polyether polyol having a functionality of 2 to 6 and an OH number of 20 to 50 mg KOH/g are present in the polyol blend in a weight ratio of at least 1:1.

6. The isocyanate-reactive composition of claim 1, wherein the aromatic polyester polyol having a functionality of 1.5 to 3 and an OH number of 150 to 450 mg KOH/g and the polyether polyol having a functionality of 2 to 6 and an OH number of 20 to 50 are present in amount of amount of at least 80% by weight, based on total weight of polyol in the polyol blend.

7. The isocyanate-reactive composition of claim 1, wherein the catalyst comprises a modified amine catalyst that has green content.

8. The isocyanate-reactive composition of claim 7, wherein the modified amine catalyst comprise the reaction product of an amine with a natural oil.

9. The isocyanate-reactive composition of claim 1, wherein the isocyanate-reactive composition has a green content of as 30 to 50% by weight, based on total weight of the isocyanate-reactive composition.

10. The isocyanate-reactive composition of claim 1, wherein each of the polyol blend, the blowing agent composition, and the catalyst has green content.

11. The isocyanate-reactive composition of claim 1, wherein the di- or higher functional renewable polyol starter is glycerol.

12. A polyurethane foam-forming reaction mixture comprising:
  (a) a polyisocyanate present in an amount sufficient to provide an isocyanate index of 0.6 to 1.3;
  (b) a polyol blend comprising:
    (i) a polyether polyol having a functionality of 2 to 6 and an OH number of 20 to 50 mg KOH/g, which is present in an amount of at least 10% by weight, based on total weight of polyol in the polyurethane foam-forming reaction mixture and which is a reaction product of an alkylene oxide and a di- or higher functional renewable polyol starter; and
    (ii) an aromatic polyester polyol having a functionality of 1.5 to 3 and an OH number of 150 to 450 mg KOH/g, which is present in an amount of at least 15% by weight, based on total weight of polyol in the polyurethane foam-forming reaction mixture;
  (c) a blowing agent composition comprising water, the water being present in an amount of 0.5 to 10% by weight, based on total weight of the foam-forming reaction mixture and in an amount of at least 90% by weight, based on total weight of the blowing agent composition; and
  (d) a catalyst,
  wherein the polyurethane foam-forming reaction mixture has a green content of at least 15% by weight, based on total weight of the polyurethane foam-forming reaction mixture.

13. The polyurethane foam-forming reaction mixture of claim 12, wherein:
  (i) the polyether polyol having a functionality of 2 to 6 and an OH number of 20 to 50 mg KOH/g is present in an amount of 10 to 20% by weight, based on total weight of the polyurethane foam-forming reaction mixture; and
  (ii) the aromatic polyester polyol having a functionality of 1.5 to 3 and an OH number of 150 to 450 mg KOH/g is present in an amount of 15 to 30% by weight, based on total weight of the polyurethane foam-forming reaction mixture.

14. The polyurethane foam-forming reaction mixture of claim 12, wherein the aromatic polyester polyol having a functionality of 1.5 to 3 and an OH number of 150 to 450 mg KOH/g has a green content of at least 30% by weight.

15. The polyurethane foam-forming reaction mixture of claim 12, wherein the aromatic polyester polyol having a functionality of 1.5 to 3 and an OH number of 150 to 450 mg KOH/g and the polyether polyol having a functionality of 2 to 6 and an OH number of 20 to 50 are present in amount of amount of at least 80% by weight, based on total weight of polyol in the polyol blend.

16. The polyurethane foam-forming reaction mixture of claim 12, wherein the catalyst comprises a modified amine catalyst that has green content.

17. The polyurethane foam-forming reaction mixture of claim 12, wherein each of the polyol blend, the blowing agent composition, and the catalyst has green content.

18. The polyurethane foam-forming reaction mixture of claim 12, wherein the polyurethane foam-forming reaction mixture has a green content of 15 to 30% by weight, based on total weight of the polyurethane foam-forming reaction mixture.

19. A polyurethane foam formed from the polyurethane foam-forming composition of claim 12, wherein the polyurethane foam has an open-cell content of 60-94% by volume, according to ASTM-D-1940-42T.

20. A multi-layered composite article comprising:
  (a) a polyurethane foam core;
  (b) an adhesive layer in contact with and attached to at least one surface of the foam core; and
  (c) a fiber-containing layer in contact with and adhered to the adhesive layer,
  wherein the polyurethane foam core comprises the polyurethane foam of claim 19.

21. The polyurethane foam-forming reaction mixture of claim 12, wherein the di- or higher functional renewable polyol starter is glycerol.

* * * * *